United States Patent
Stoila et al.

(10) Patent No.: US 9,114,581 B2
(45) Date of Patent: Aug. 25, 2015

(54) METHOD OF APPLYING PLY TO A TIRE BUILDING DRUM

(75) Inventors: George Michael Stoila, Tallmadge, OH (US); Dale Eugene Wells, Massillon, OH (US); Thomas Alan Sells, Topeka, KS (US); Thierry Royer, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/562,605

(22) Filed: Jul. 31, 2012

(65) Prior Publication Data

US 2013/0160930 A1     Jun. 27, 2013

Related U.S. Application Data

(60) Provisional application No. 61/579,194, filed on Dec. 22, 2011.

(51) Int. Cl.
*B29D 30/30* (2006.01)
*B29D 30/44* (2006.01)

(52) U.S. Cl.
CPC ............ *B29D 30/30* (2013.01); *B29D 30/3007* (2013.01); *B29D 2030/4418* (2013.01)

(58) Field of Classification Search
CPC .......... B29D 2030/0038; B29D 30/08; B29D 30/20; B29D 30/3007; B29D 2030/4406; B29D 2030/4412; B29D 2030/4418; B29D 30/30
USPC ............ 156/133, 405.1, 413, 421; 198/861.4, 198/897; 74/490.08; 254/13, 98, 101
See application file for complete search history.

(56) References Cited

U.S. PATENT DOCUMENTS

| | | | | |
|---|---|---|---|---|
| 1,037,874 | A | * 9/1912 | Crabb | ........................... 254/103 |
| 1,071,213 | A | 8/1913 | Crabb | |
| 3,881,605 | A | 5/1975 | Grossman | |
| 4,222,810 | A | * 9/1980 | Ytterstrom | .................... 156/395 |
| 4,266,430 | A | 5/1981 | Glassey | |

(Continued)

FOREIGN PATENT DOCUMENTS

EP  1588832 A1  10/2005
JP  62-184844  * 8/1987  ............. B29D 30/28

(Continued)

OTHER PUBLICATIONS

English language Abtract for JP 62-184844 (original document dated Aug. 1987).*

(Continued)

*Primary Examiner* — Martin Rogers
(74) *Attorney, Agent, or Firm* — June E. Rickey

(57) ABSTRACT

A method for applying a sheet of flexible material to a cylindrical body is described. The sheet of material may be ply or a tire building component such as a liner. The method includes the steps of receiving the sheet of flexible material onto a conveyor belt of a conveyor table, wherein the conveyor belt can translate in the X direction, wherein the conveyor belt has a plurality of rollers rotatably mounted on the conveyor belt so they can rotate about an axis aligned with the X direction. The method further includes aligning a lateral edge of the sheet with an edge guide of the conveyor table by tilting the conveyor table and then tilting the conveyor table back to a level position. The method further includes moving a front edge of the conveyor table adjacent the cylindrical body; and applying the sheet onto the cylindrical body.

15 Claims, 18 Drawing Sheets

(56) References Cited

U.S. PATENT DOCUMENTS

| | | | |
|---|---|---|---|
| 4,407,684 A | | 10/1983 | Budzowski |
| 4,596,617 A | | 6/1986 | Ishll |
| 4,769,104 A | * | 9/1988 | Okuyama et al. .......... 156/406.4 |
| 4,796,104 A | * | 1/1989 | Ito et al. ......................... 386/317 |
| 4,840,697 A | * | 6/1989 | Goodfellow et al. ...... 156/405.1 |
| 4,890,420 A | * | 1/1990 | Azimi ........................... 451/273 |
| 4,893,784 A | * | 1/1990 | Abraham et al. ............. 254/100 |
| 5,238,100 A | | 8/1993 | Rose et al. |
| 5,240,102 A | | 8/1993 | Lucas |
| 5,542,647 A | * | 8/1996 | Huetsch ........................ 254/420 |
| 5,755,904 A | * | 5/1998 | Longo et al. .................... 156/96 |
| 5,915,611 A | * | 6/1999 | Baldoni et al. .................. 226/19 |
| 6,227,357 B1 | | 5/2001 | Brown |
| 6,981,580 B2 | * | 1/2006 | Meyer ........................... 198/415 |
| 7,147,097 B2 | | 12/2006 | Lemm |
| 7,540,368 B2 | * | 6/2009 | Weiser .................... 198/370.09 |
| 7,708,132 B2 | * | 5/2010 | Gilbert et al. ................. 198/588 |
| 7,909,159 B1 | * | 3/2011 | Zats et al. ..................... 198/586 |
| 2005/0017440 A1 | * | 1/2005 | Jewell ........................... 271/250 |
| 2008/0149259 A1 | * | 6/2008 | Downing et al. ............. 156/123 |
| 2008/0302634 A1 | * | 12/2008 | Costanzo et al. ........ 198/370.09 |
| 2010/0107795 A1 | * | 5/2010 | Viola ........................ 74/471 R |
| 2010/0218480 A1 | | 9/2010 | Vauchel et al. |

FOREIGN PATENT DOCUMENTS

| | | | | |
|---|---|---|---|---|
| JP | 07-266456 | * | 4/1994 | ............. B29D 30/30 |
| JP | 2005-313425 | * | 11/2005 | ............. B29D 30/30 |
| JP | 2008-200998 | * | 9/2008 | ............. B29D 30/30 |
| WO | WO2005009726 A2 | | 2/2005 | |

OTHER PUBLICATIONS

Machine-generated English language translation of JP 2005-313425 (original document dated Nov. 2005).*

Machine-generated English language translation of JP 2008-200998 (original document dated Sep. 2008).*

Machine generated English language translation of JP 07-266456 (original document dated Apr. 1994).*

EPO Search Report dated Apr. 9, 2013.

* cited by examiner

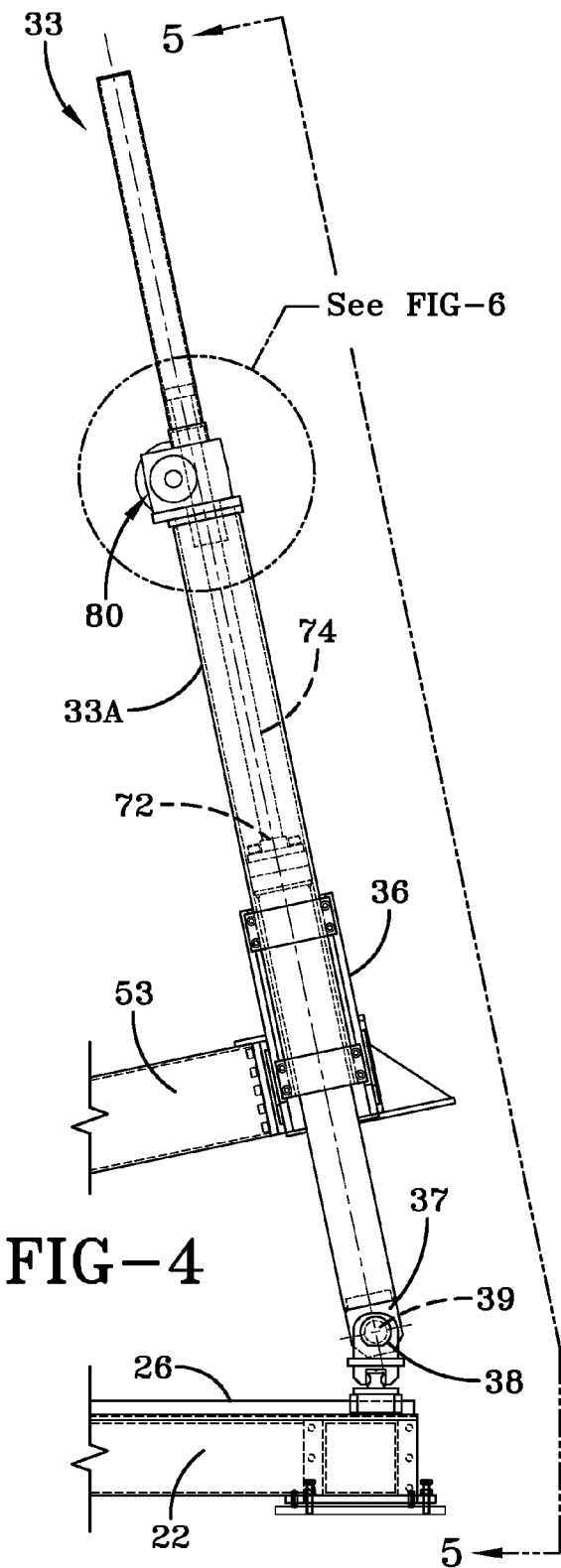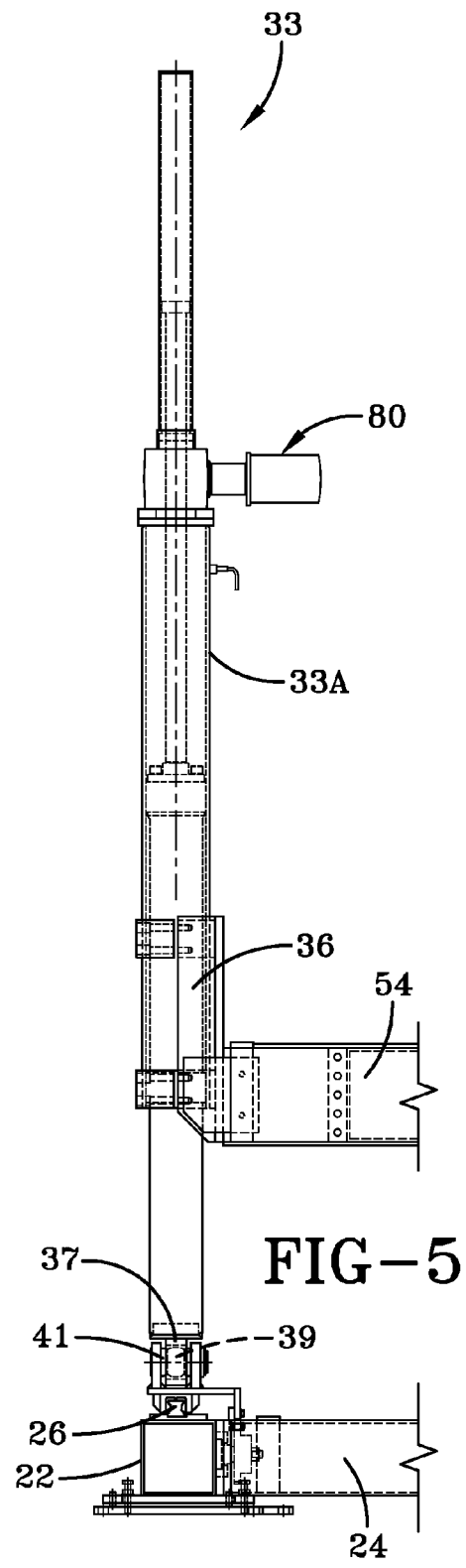

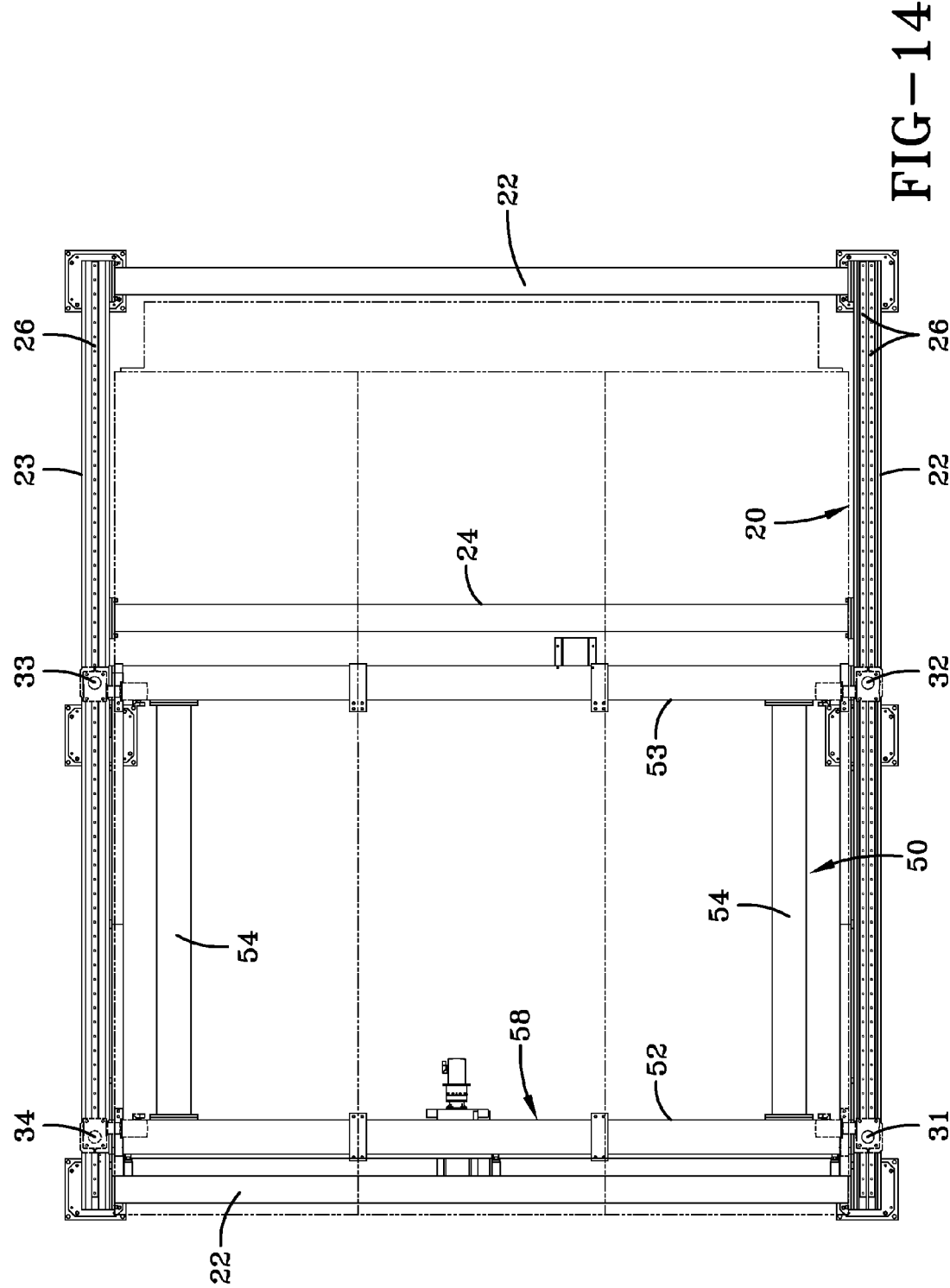

METHOD OF APPLYING PLY TO A TIRE BUILDING DRUM

This application claims the benefit of and incorporates by reference U.S. Provisional Application No. 61/579,194, filed Dec. 22, 2011.

FIELD OF THE INVENTION

The invention relates in general to the art of tire building, and more specifically to the applying of tire sheet components such as, but not limited to, tire ply, inner liner or sidewall directly onto a cylindrical body such as a tire building drum.

BACKGROUND OF THE INVENTION

Tire ply or other rubber components are often applied to a tire building drum with a conveyor type device often referred to as an applier. Prior art appliers typically utilize a conveyor type belt to precisely apply the tire component onto the tire building drum. It is important to precisely control the application of the tire component onto the drum, and is particularly of concern for the tail end of the component. It is also important that the component be applied as quickly and as efficiently as possible. The applier must also retract sufficiently from the drum to provide clearance for other mechanisms and functions. Further, prior art appliers typically require a separate drive and adjustment mechanism in order to make the applier adjustable to different sizes of tire building drums.

For large tires such as 57 inch tires or larger, the ply size is very large and heavy. The ply size can range from about 8 feet by 8 feet to about 10 feet by 10 feet. The weight can vary from about 1700 lbs to 2200 pounds. Prior to application to the tire building drum, the ply is typically wound up onto a spindle of a cart for application onto an applier conveyor system. The ply is typically wound in such a manner that it is not centered with respect to the frame. The ply is delivered onto the applier server so that it is not aligned square to the server and thus will be misaligned with the tire building drum.

Thus a tire ply server is needed that ensures that the ply delivered to the tire building drum in a properly aligned condition with respect to the drum such that the leading edge of the ply is square to the drum, and that the center of the ply is aligned with the drum centerline, and also that the ply cords are straight and square to the drum centerline.

SUMMARY OF THE INVENTION

A method for applying a sheet of flexible material to a cylindrical body is described. The sheet of material may be ply or a tire building component such as a liner. The method includes the steps of receiving the sheet of flexible material onto a conveyor belt of a conveyor table, wherein the conveyor belt can translate in the X direction, wherein the conveyor belt has a plurality of rollers rotatably mounted on the conveyor belt so they can rotate about an axis aligned with the X direction. The method further includes aligning a lateral edge of the sheet with an edge guide of the conveyor table by tilting the conveyor table and then tilting the conveyor table back to a level position. The method further includes moving a front edge of the conveyor table adjacent the cylindrical body; and applying the sheet onto the cylindrical body.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 4 is a side view of a leg support of the ply server shown in an angled position.

FIG. 5 is a side view of the leg support of the ply server of FIG. 4 in the direction 5-5.

FIG. 14 is a top view of the support frame and support legs, as shown in FIG. 13.

DETAILED DESCRIPTION OF THE INVENTION

FIGS. 1-14 illustrate a first embodiment of a tire component applier 10 of the present invention. The tire component applier 10 functions to properly align a tire component such as tire ply or tire liner with respect to a tire building machine or drum 5, and then apply the tire component onto the tire building drum. For large tires having a diameter size of 50 inches or higher, this can be extremely difficult because the tire ply itself can weigh in the range of 1000 to 2000 pounds, and have a size on the order of 10 feet by 10 feet. If the tire component is ply having a plurality of parallel cords, the tire component applier 10 ensures the cords are straight and perpendicular to the tire building drum axis in the case of a radial tire, and that the front edge of the tire ply is square or perpendicular to the tire building drum.

Figure 13:
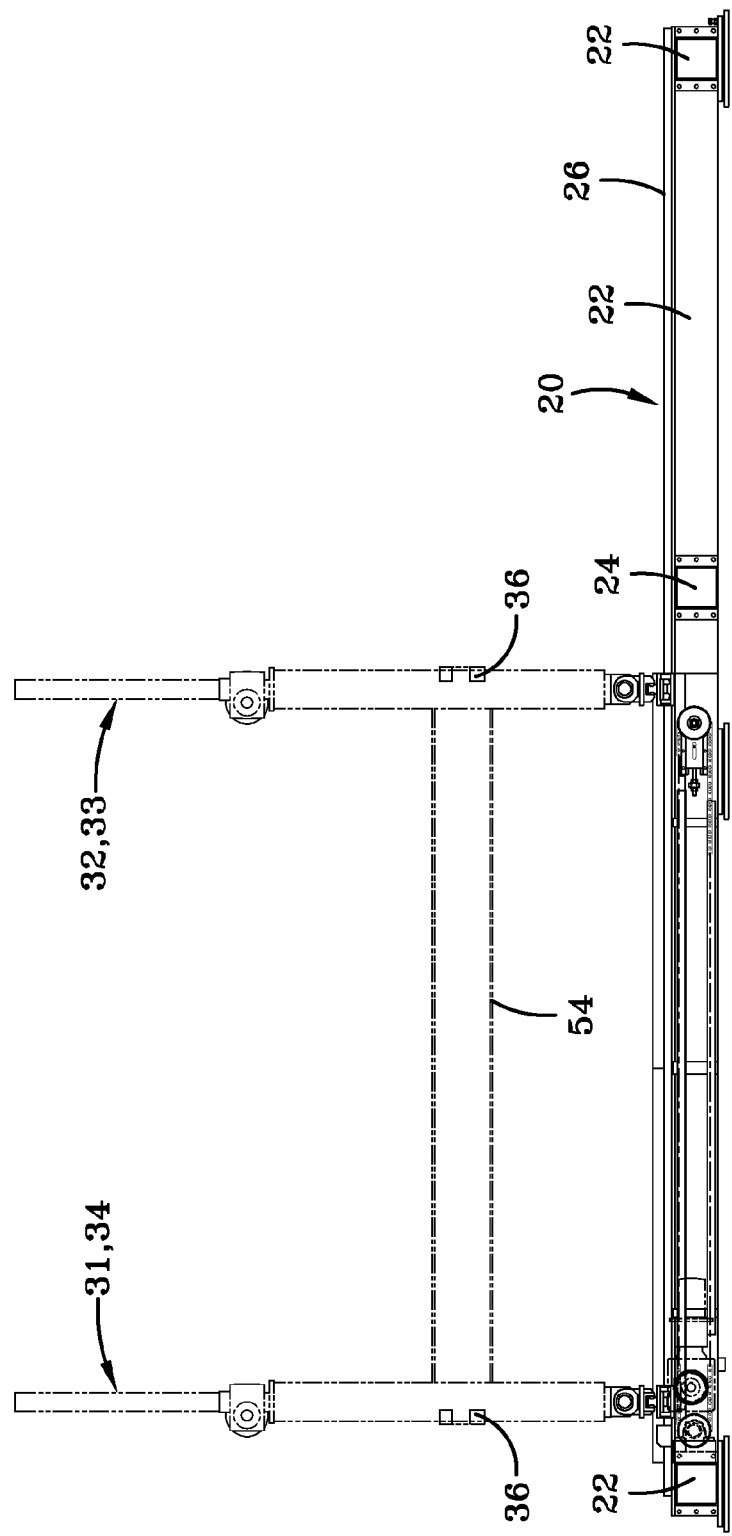
FIG. 13 is a side view of the support frame and support legs of the ply server.

As shown in FIGS. 1-3B and FIGS. 13-14, the tire component applier 10 comprises a stationary support frame 20. The support frame 20 as best shown in FIGS. 13-14 is a rectangular shaped support comprised of four support beams 22, 23 and one or more cross beams 24. Support beams 22,23 may be mounted to the floor or other support structure. Two of the parallel support beams 22 have a rail 26 mounted on the upper surface of the support beam or allowing the tire applier to slide fore and aft, as described in more detail, below. It is preferred that at least one of the support rails 23 have a double rail 26, as described in more detail, below.

Figure 7:
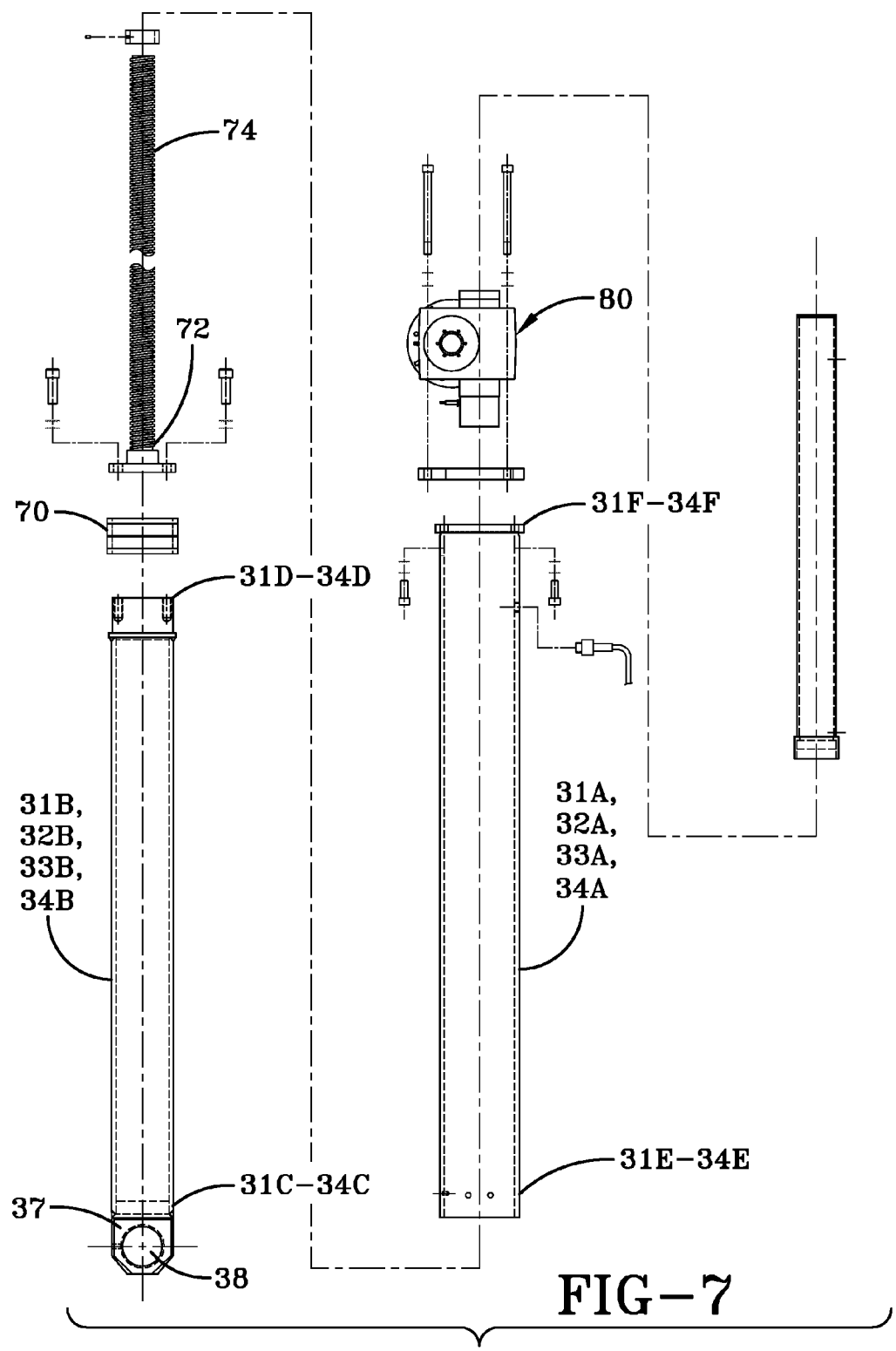
FIG. 7 is an exploded view of the leg support.
Figure 8:
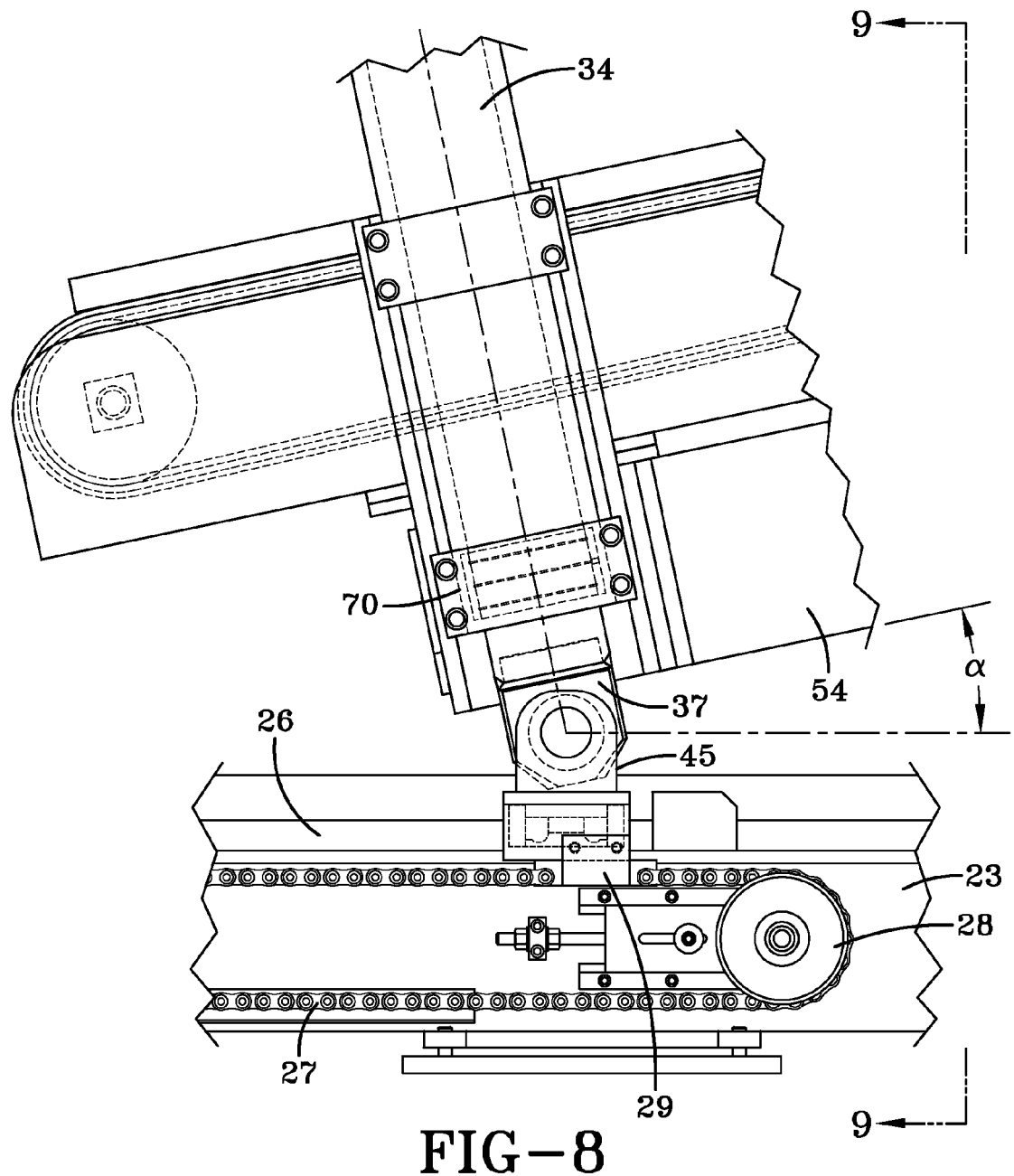
FIG. 8 is a close up view of the circled portion of FIG. 3B.

The tire applier 10 further comprises four support legs 31, 32, 33, 34 which support a conveyor table 40. Each support leg has an outer telescoping portion 31a, 32a, 33a, 34a which slides over inner leg portion 31b, 32b, 33b, 34b. The inner leg portions therefore slide within the respective outer leg portions on collar bearing 70. As shown in FIGS. 7 and 9, each inner leg portion has a flanged end 37 having a center hole 38 for receiving a ball joint 39 therein. The ball joint 39 is received within center hole 38 and is rotatably mounted against adjacent bearings 39b. The bearings 39b are contained between a pair of flanged ends 43 mounted on a foot 45. Each foot 45 has a linear bearing 47 which slides on rail 26 (FIG. 9), so that the entire applier can slide fore and aft along its major axis (X axis). As shown in FIG. 8, at least one of the feet 45 is connected to a chain 27 via a chain connector 29.

The chain 27 is driven by a gear 28 connected to a servo motor (not shown), which slides the entire applier 10 fore and aft along support rails 26.

Figure 9A:
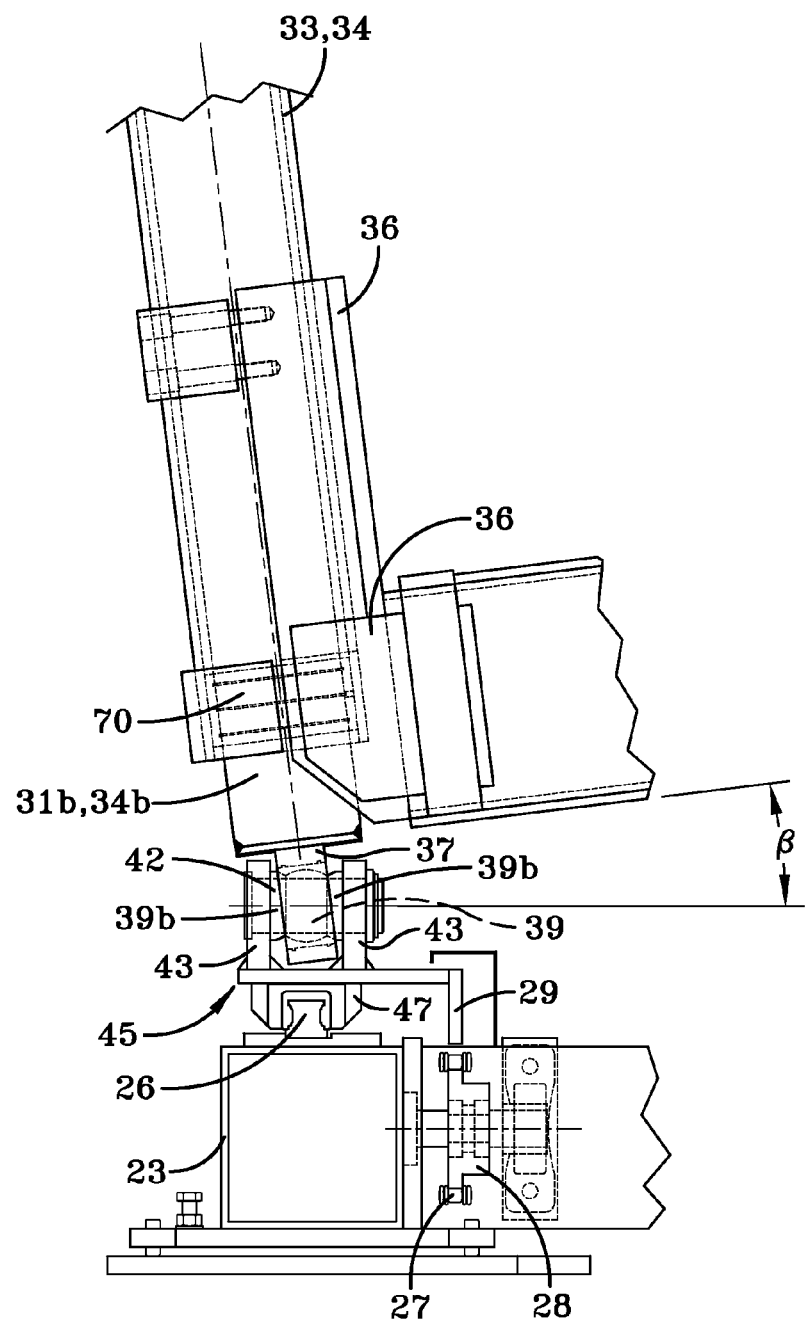
FIG. 9A is a close up view in the direction 9-9 of FIG. 8.
Figure 9B:
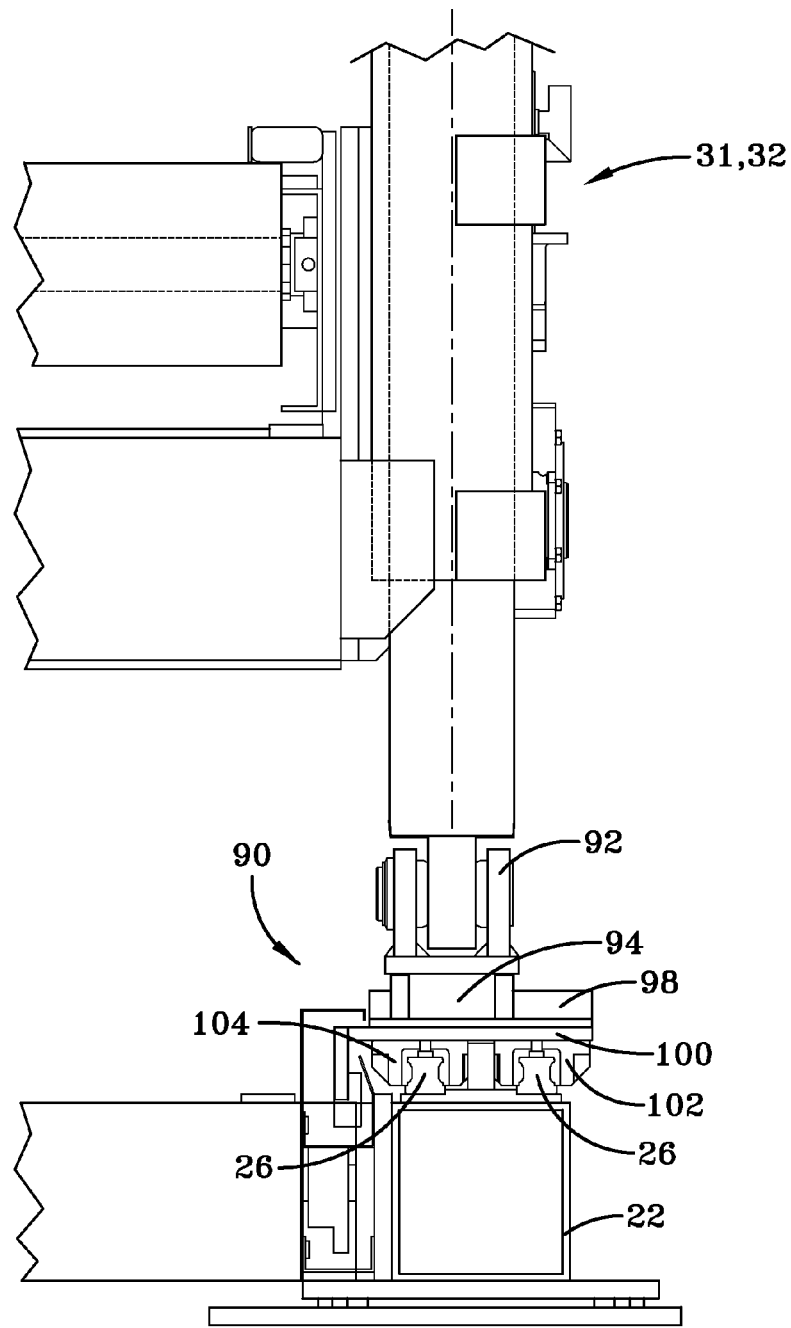
FIGS. 9B-9D illustrate the foot and support legs in an upright position (FIG. 9B), a tilted to the right position (FIG. 9C) and a tilted to the left position (FIG. 9D)
Figure 9C:
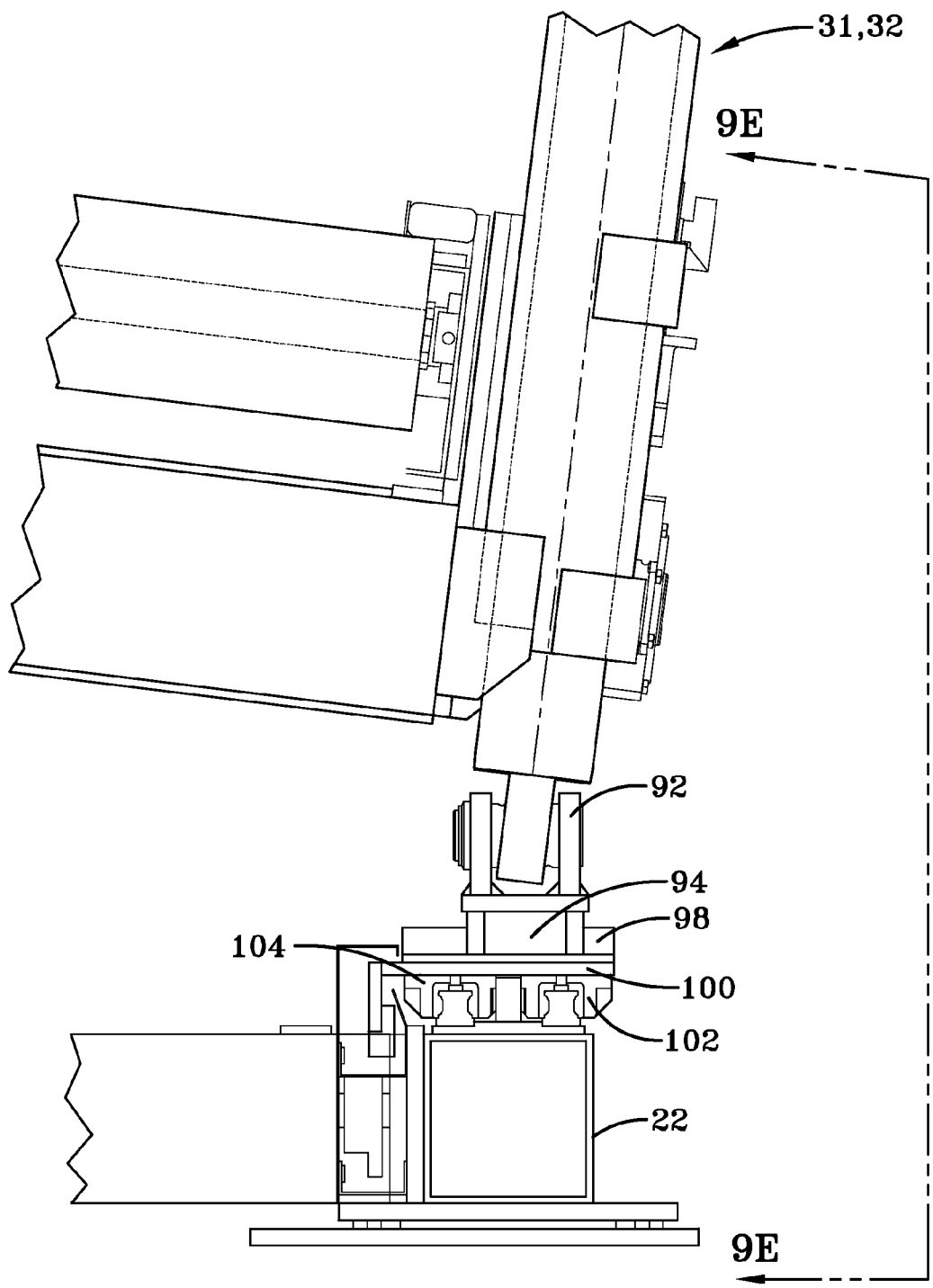
Figure 9D:
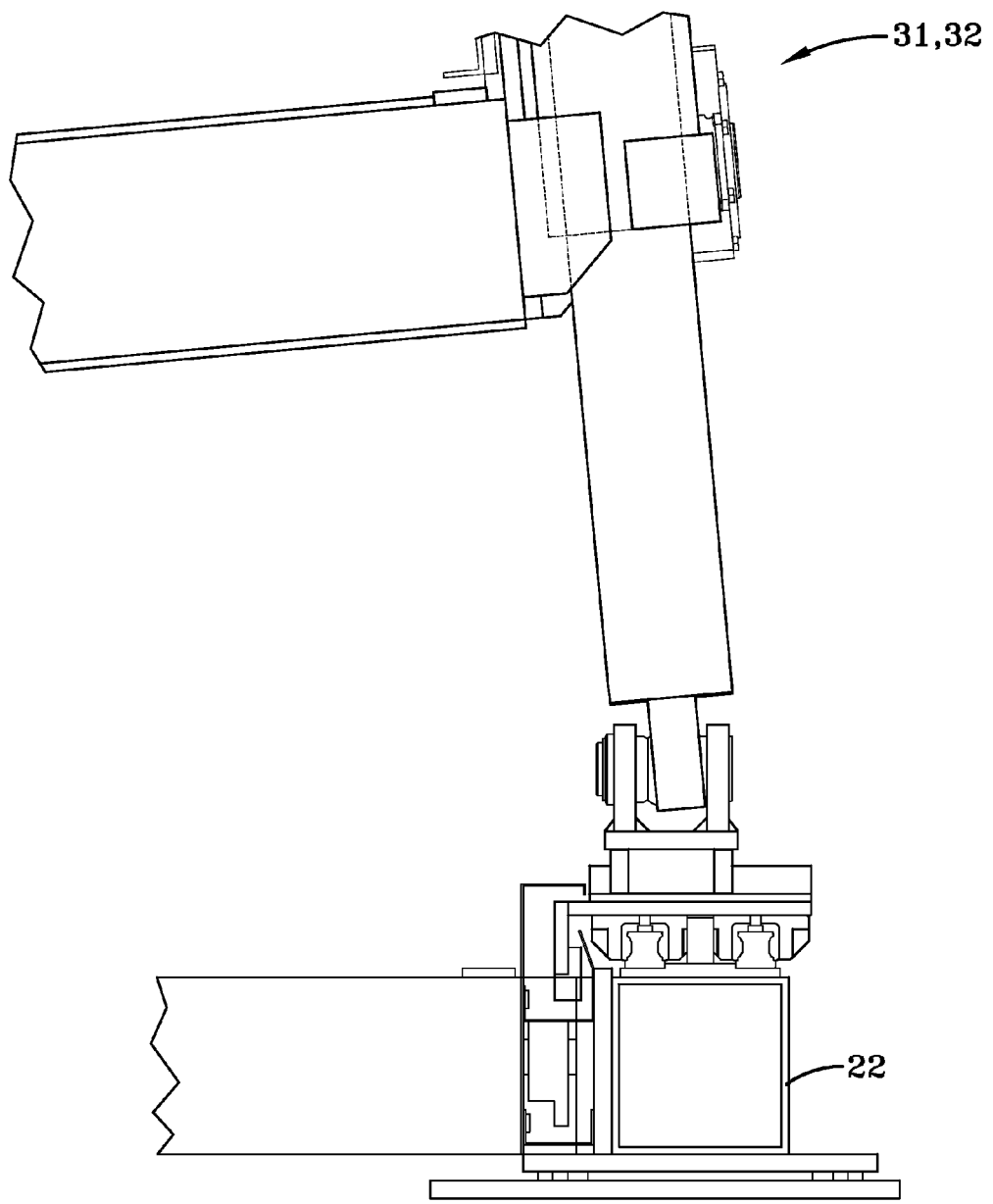
Figure 9E:
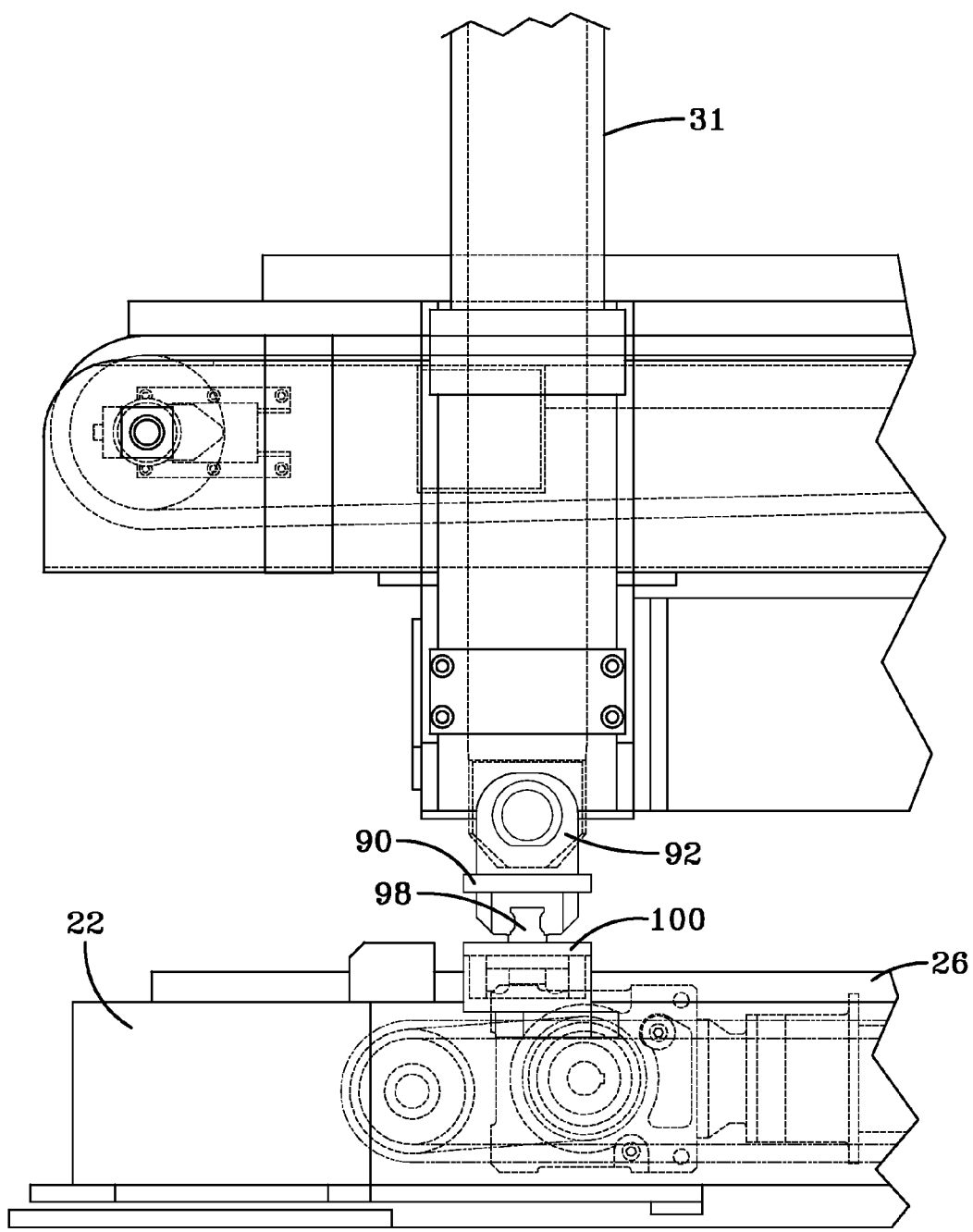
FIG. 9E is a perspective view of the foot and support legs in the direction of 9E-9E of FIG. 9C.

As stated earlier, it is preferred that one of the support beams 23 have two parallel rails 26 mounted thereon. Support beam 23 has a single rail 26. The support legs 33,34 slide fore and aft on beam 23 and are shown in FIGS. 8-9. Support legs 31,32 preferably ride on double rails 26 mounted on beam 22 and are slightly different in construction as shown in FIGS. 9B-9D. Support legs 31,32 have modified feet 90 that allow the support legs to translate fore and aft on two support rails 26 in the X direction, and further allow for translation in the Z direction (perpendicular to the rail axis). Each support leg 31,32 has a foot 90 having spaced flanged ends 92 which receive the flanged ends 37 of support legs and the ball joint 39. Each foot also has a linear bearing 94 which slides on lateral rail 98 to allow the table to translate a small amount in the Z direction (direction of table minor axis). Lateral rail 98 is mounted on platform 100 which has two linear bearings 102,104 mounted on the underside opposite the lateral rail 90, for sliding on double rails 26. FIG. 9B illustrates the support leg in an straight position, while FIG. 9C illustrates the foot slid laterally outward in the Z direction when the table is tilted outwardly. FIG. 9D illustrates the foot which has partially slid outward in the Z direction when the table is tilted inwardly.

The conveyor table 40 is structurally supported by a table support 50 which includes two parallel support members 52,53 joined by two parallel cross supports 54 in a rectangular configuration. A first support member 52 has opposed ends which are fixedly connected to outer portion of support legs 31a and 34a via support brackets 36. A second support member 53 has opposed ends which are fixedly connected to the outer portion of support legs 32a and 33a via support brackets 36. Cross members 54 provide increased frame rigidity and structural support.

Figure 2:
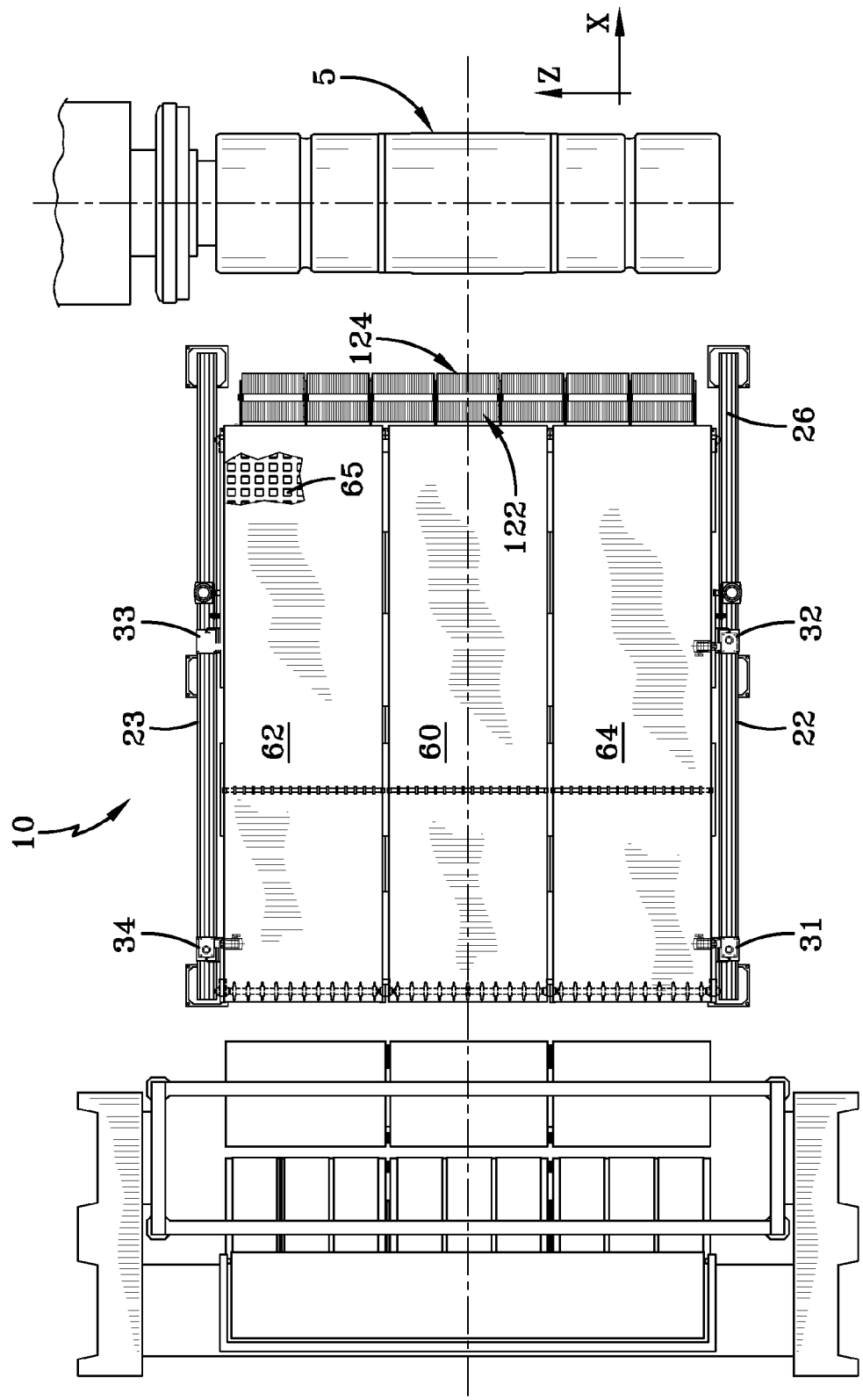
FIG. 2 is a top view of the system of FIG. 1.

A first portion 42 of the conveyor table 40 is connected to the table support 50 via fasteners (not shown). A second portion 44 of the conveyor table is cantilevered, and extends from the table support 50 so that the ply can be applied to the tire building drum without interference. As shown in FIG. 2, the conveyor table 40 includes at least one conveyor belt 60. Preferably, the conveyor table 40 includes at least two conveyor belts 60, 62, which are preferably independently operable with respect to each other. More preferably, the conveyor table includes at least three independently operable conveyor belts 60, 62, 64. Even more preferably, each conveyor belt 60,62,64 has a plurality of directional rollers which rotate about an axis parallel to the major axis of the table (X axis). The directional rollers 65 allow the ply to be conveyed laterally in the Y direction (minor axis). Each conveyor belt is driven by a motor 66, only partially shown, and the conveyor belt is capable of being driven in both directions.

Figure 3A:
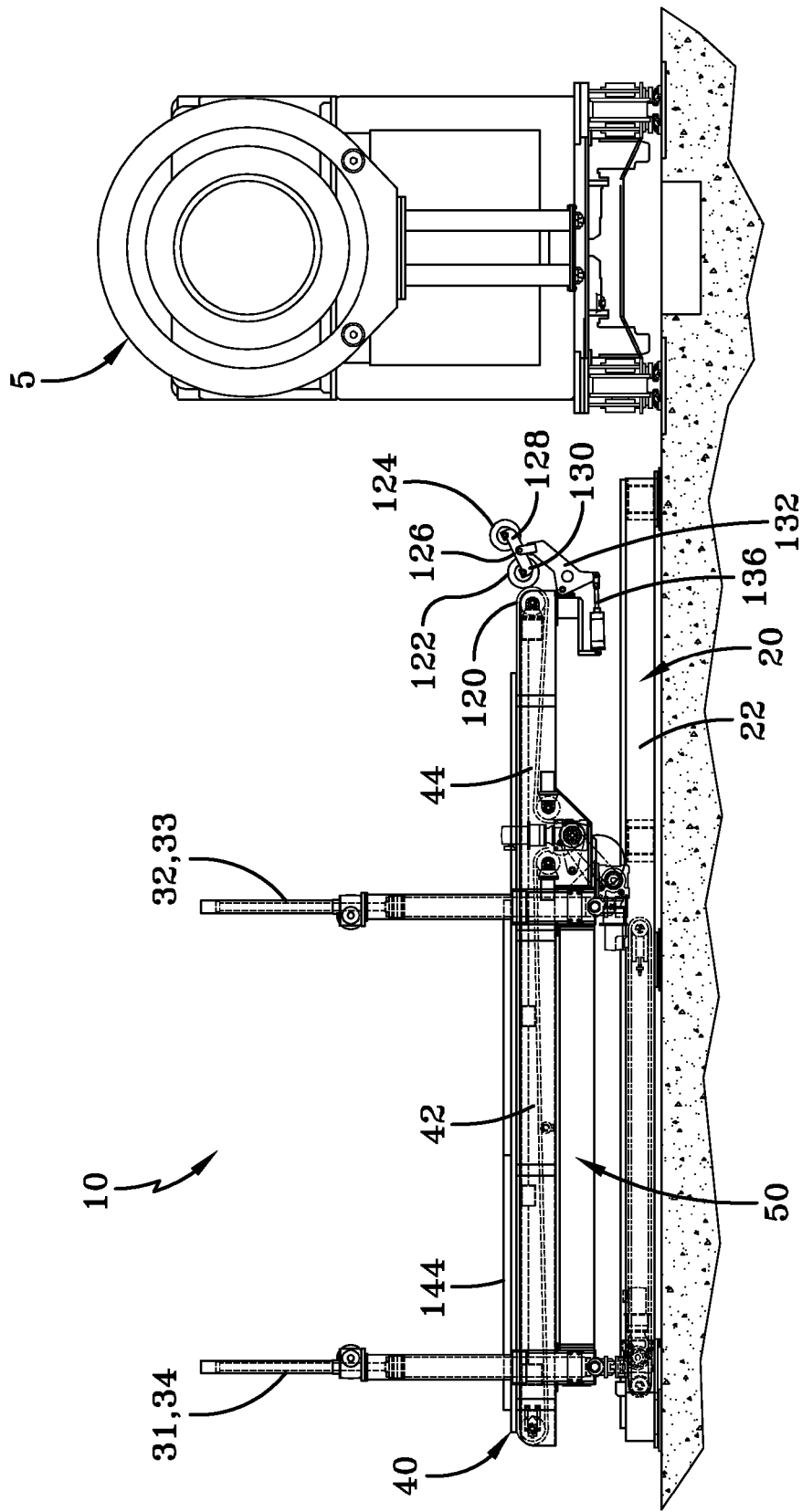
FIG. 3A is a side view of the ply server and a tire building drum shown in a first position.
Figure 3B:
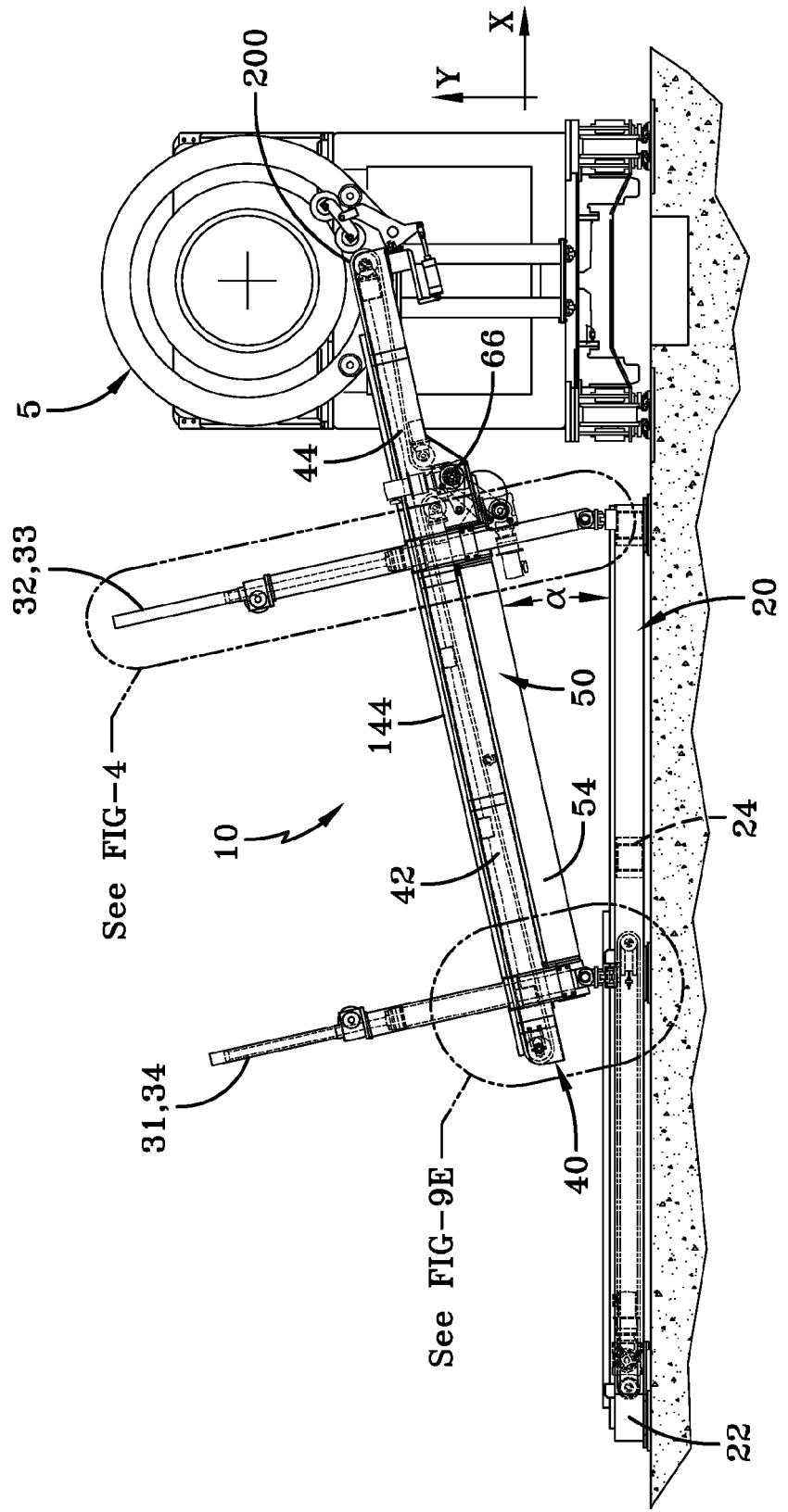
FIG. 3B is a side view of the ply server and a tire building drum shown in an application position.
Figure 6:
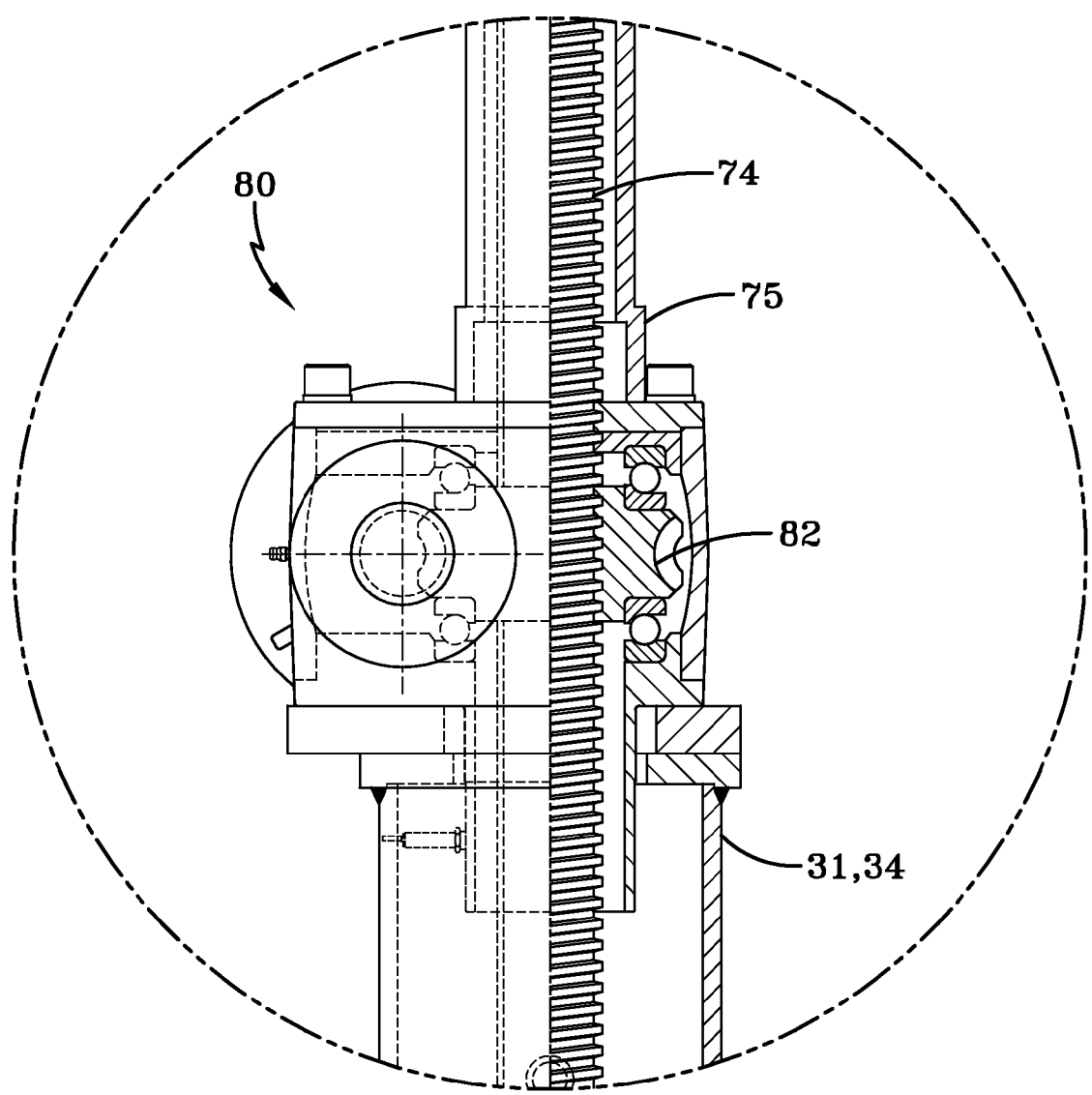
FIG. 6 is a close up perspective view of the circled portion of FIG. 4.
Figure 11:
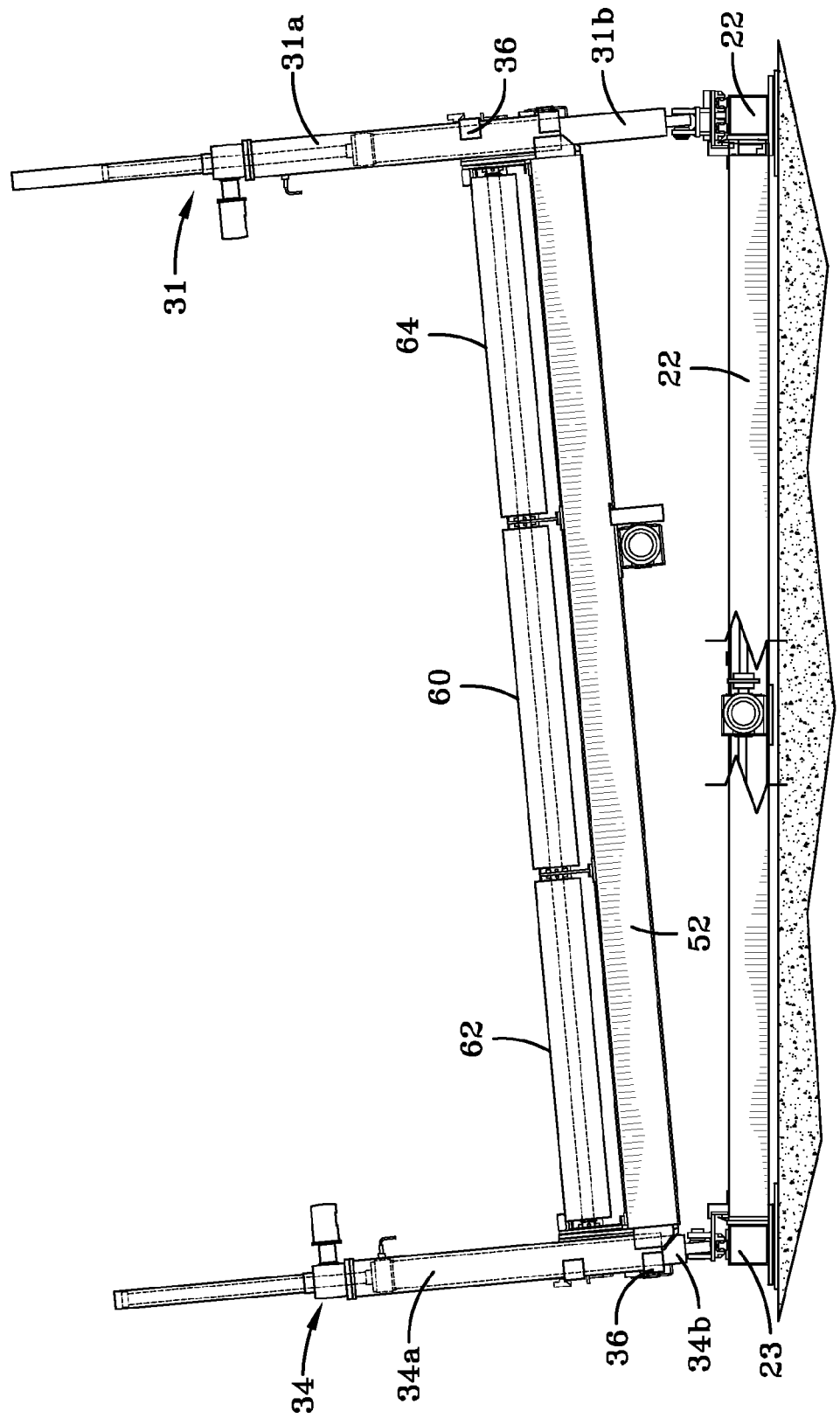
FIG. 11 is a rear view of the ply server shown tilted in a first direction.
Figure 12:
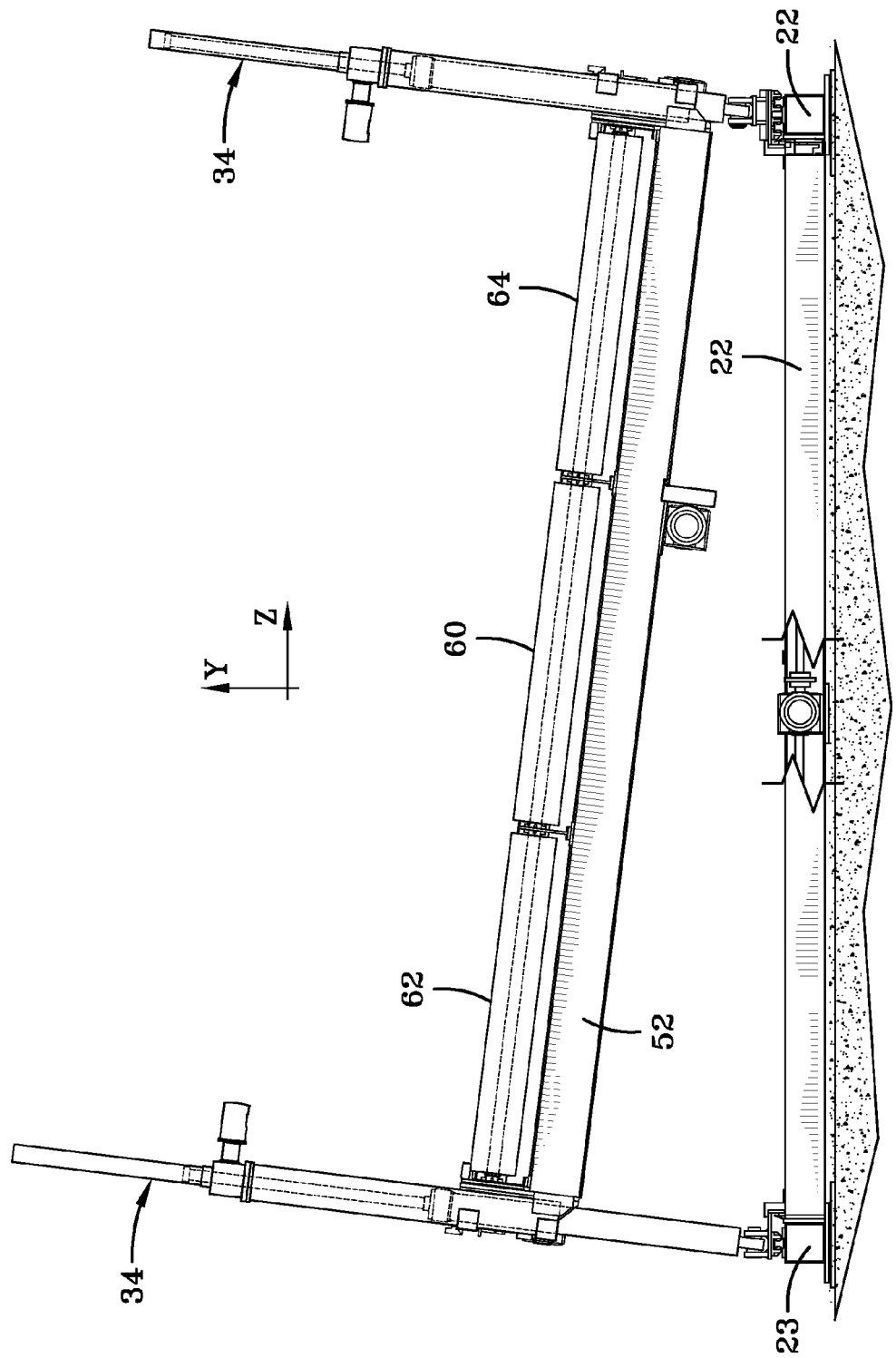
FIG. 12 is a front view of the ply server shown tilted in a second direction opposite the first direction.

The conveyor table as shown in FIGS. 3A and 3B, can rotate about the Z axis an angle α in the range of about 0 to about 30 degrees. The conveyor table can also rotate about the X axis in the range of about −30 degrees to about +30 degrees, as shown in FIGS. 11-12. The conveyor table can rotate about the Z axis, and the X axis, or both axes at the same time for the following reasons. Each support leg has a foot which has a joint which can rotate in all directions, and is only constrained by the geometry of the system. In order to rotate the conveyor table about the Z axis as shown in FIG. 3b, the table is raised about support legs 32, 33 and the table is lowered with respect to support legs 31,34. In order to rotate the conveyor table about the X axis as shown in FIGS. 11, the table is raised with respect to support legs 31,32 and lowered with respect to support legs 33,34. In order to tilt the table to the other side as shown in FIG. 12, the conveyor table is raised with respect to support legs 33,34 and lowered with respect to support legs 31,32.

Figure 10:
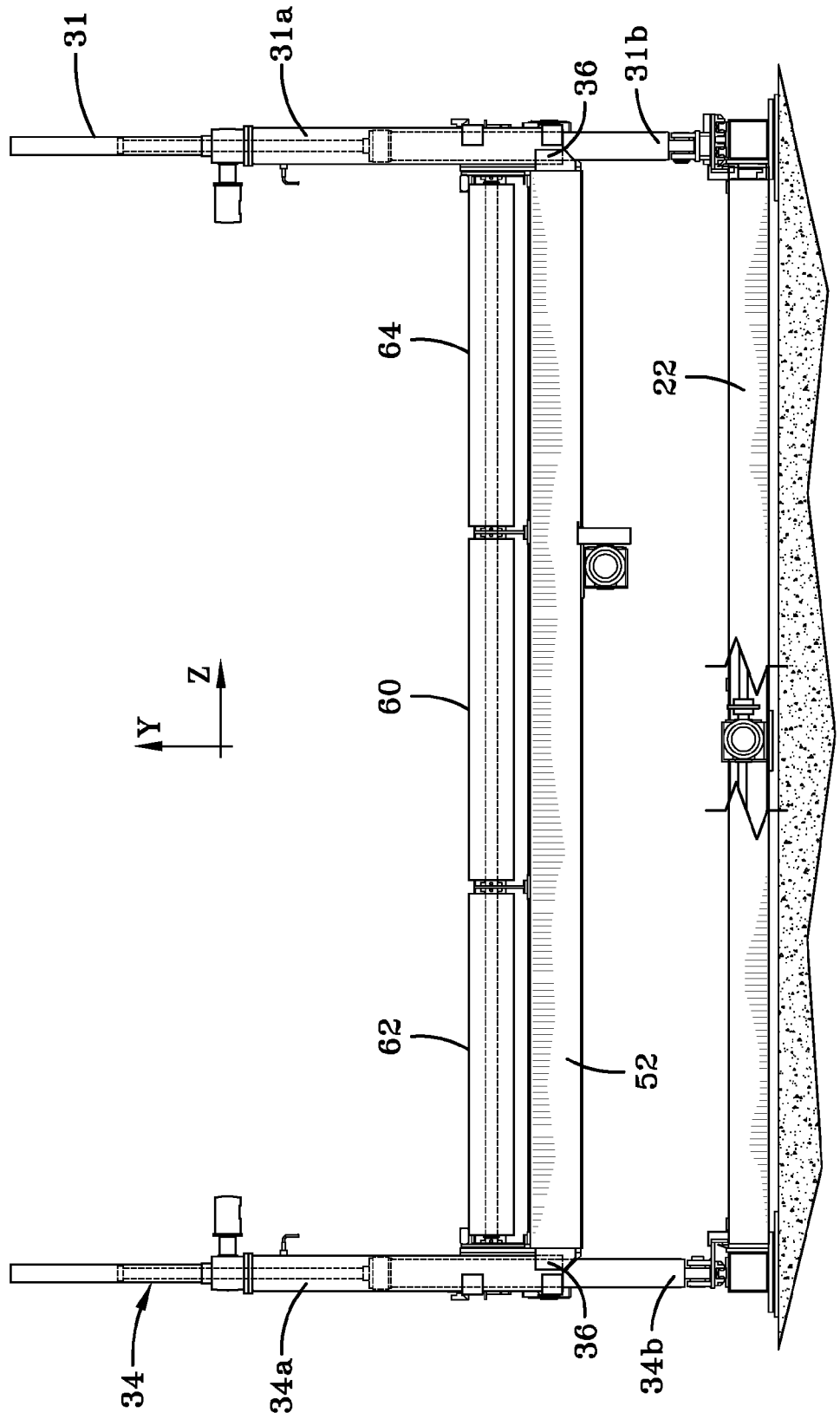
FIG. 10 is a rear view of the ply server in the direction 10-10 of FIG. 1.

The conveyor table can be raised and lowered with respect to each support leg in a manner as described in more detail, below. Each support leg 31-34 has an outer portion 31-34*a* which slides over a respective inner portion 31-34*b* in a telescoping fashion. Each inner leg portion 31-34*b* has a first end 31-34*c* having a flanged end for coupling to a foot, and a second end 31-34*d* connected to an inner end 72 of a linear screw 74 so that the screw can rotate. The outer leg portion 31-34*a* has a first end 31-34*e* having a annular bearing ring 70 inserted therein to facilitate the outer first end having a smooth telescoping motion over inner leg 31-34*b*. The table support frame 50 is fixedly connected to each support leg near the first end 31-34*e* by a leg support bracket 36, so that as the outer leg portion telescopes for and aft, the table support frame moves therewith. The outer leg portion 31-34*a* further comprises a second end 31-34*f* which is connected to a linear screw drive mechanism 80, as shown in FIGS. 4-7. The screw drive mechanism 80 engages a rotatable linear screw 74. The screw drive mechanism 80 further includes a nut 82 which engages linear screw 74. The screw is rotated by a gear and motor assembly (not shown) or other means known to those skilled in the art. As the screw is rotated in a first direction, the nut is translated upward in a first direction parallel to the Y direction. As the screw is rotated opposite the first direction, the nut is translated downward. As the nut is translated in either direction, the outer leg portion also translates and telescopes, resulting in the lifting/lowering of the table. Thus the operation of the screw drive mechanism results in the conveyor table being lifted. As best shown in FIGS. 10-12, the rear view of the applier 10 is shown in a level state, and a tilted state. As shown in FIG. 10, the applier is level. In order to tilt the table to the left as shown in FIG. 11, the screw of leg 34 is rotated, resulting in the nut traveling downward. As the nut travels downward in a direction parallel to the Y axis, the outer portion of the leg connected to the screw assembly telescopes in a downward direction over the inner leg portion, resulting in the table moving downward, wherein the leg is fully retracted. In order to lift the table, the screw of leg 31 is rotated in the opposite direction of screw 34, so that the nut of leg 31 translates upward resulting in the outer portion of leg 31 telescoping outward in a expanding way over inner portion of leg 31.

The front edge 120 of the body ply table is fitted with at least one row of brush rollers, and is preferably fitted with at least two rows of brush rollers 122, 124. Each row of brush rollers comprise one or more brush rollers. Preferably each brush roller is mounted so that it can rotate about its longitudinal axis so that it can rotate. The brush rollers in the upper or first row 122 are mounted to a first end 130 of a support bar 126. The brush rollers in the lower row are mounted to a second end 128 of the support bar 126. The support bar is pivotally mounted to a linkage 132 having a distal end 134 which is mounted to the arm 138 of a linear actuator 136. The linkage is pinned to the end of support frame at connection 140, allowing the linkage to rotate about the pinned connection, but not allowing translation. When the arm of the linear actuator 136 opens and closes, the linkage 132 pivots about connection 140, causing the one or more rows of rollers to rotate upwardly or downwardly in the +/−Y direction.

The brush rollers 122,124 are configured to support the ply or liner as the ply is being applied to the tire building drum. As shown in FIG. 3*b*, the conveyor table is positioned beneath the tire building drum with the rollers tilted upwardly so that the rollers are located adjacent the tire building drum. As the ply/liner is conveyed forward, the rollers apply the liner/ply to the tire building drum. The tire building drum may be convex in shape when viewed from the side. The brush rollers are designed to provide minimum force at the drum centerline, and maximum load holding and positioning forces at the outboard edges. One way to accomplish this is to have the brush rollers at the outboard edges to be stiffer than the brush rollers near the drum centerline. In addition, it is preferred that the brush rollers be grouped in multiple sets, each set having a pair 122,124 of rollers and a actuating mechanism 132, 136. It is additionally preferred that each brush roller lifting cylinder 136 be fitted with programmable control valves to allow precise, discreet air pressure to each cylinder so that a precise, discreet force is applicable to the sheet. Thus the roller force may vary from the center of the table and be higher on the outer edge of the table. The programmable valves allow for independent control of each set of brush rollers.

System Operation

The operation of the system can now be described. A sheet of ply, inner liner or other sheet of tire component (hereinafter "sheet") is cut to length and then fed onto the rear portion of the conveyor belts 60,62,64. All three conveyor belts are driven forward in the X direction, ie, in a direction towards the tire building machine until all of the component is mounted onto the conveyor table. At this stage, it is typical for the ply to have a front edge that is misaligned, ie, not square to the tire building drum.

In order to align the ply or tire component, the table is tilted to one side by the operator as shown in FIG. 11. The table can tilt to either side because it is affixed to each support leg, and each support leg can be raised and lowered independently of each other. Each support leg has an outer telescoping portion which slides over an inner leg portion. Each inner leg portion is rotatably coupled to a foot such that the leg can freely pivot or rotate in all directions. The inner leg portion is connected to the rotatable linear screw, while the outer leg portion is connected to a nut. As the screw rotates, the nut travels along the screw, raising or lowering the outer leg portion which is affixed to the conveyor table.

Figure 1:
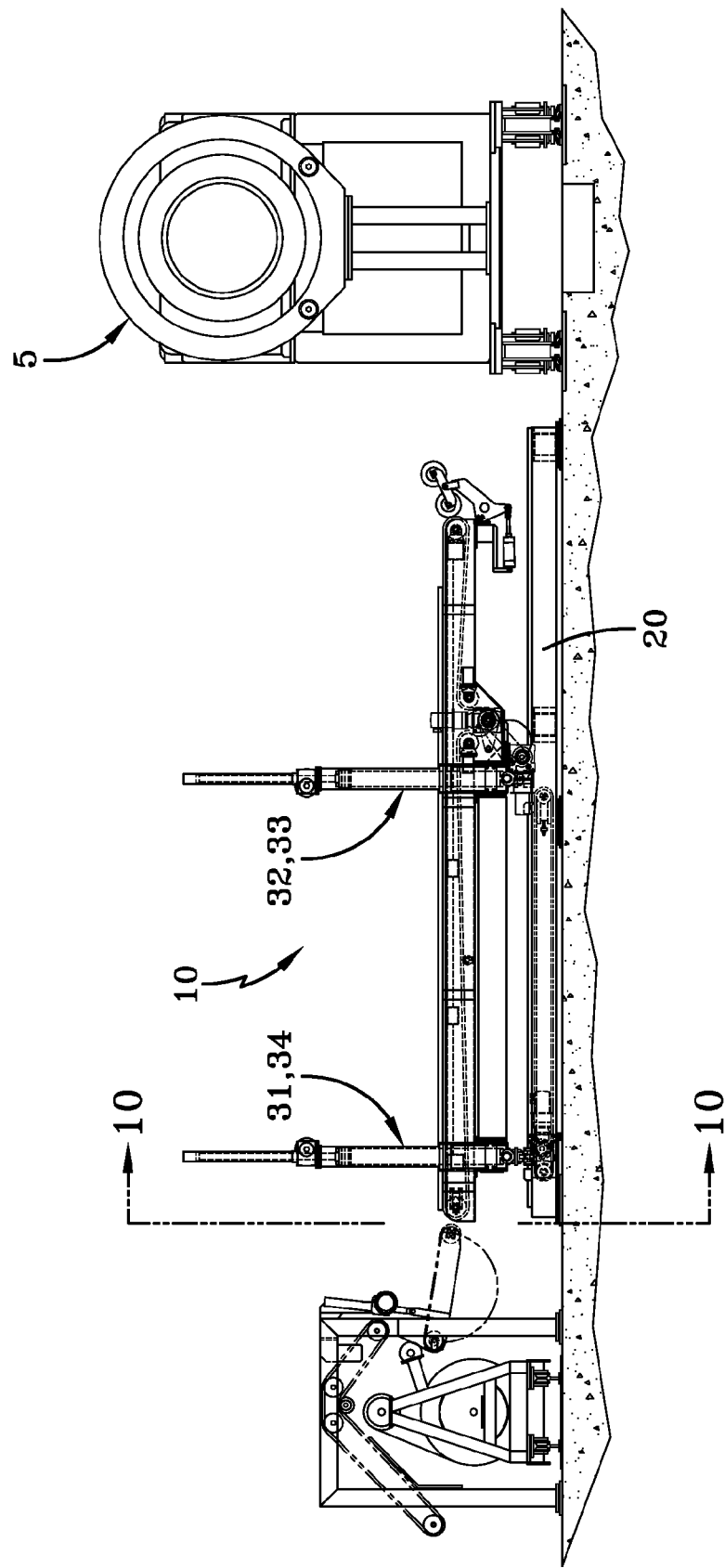
FIG. 1 is a side view of a ply server of the present invention shown together with a tire building machine and a ply cart.

As the table is tilted to one side by the operator as shown in FIG. 11, the ply or component slides on the conveyor belt rollers towards an edge guide 144. The conveyor belt rollers only rotate in one direction so that the ply can translate towards the edge guide, ie, in the Z direction. The tilt angle of the table ensures that the entire edge of the ply is aligned with the entire edge of the edge guide. After the edge alignment has occurred, the table is then tilted back to its starting position, as shown in FIG. 1. Table sensors mounted near the edge guide notify the operator of misalignment of the component. After the ply or component edge is aligned, the table is translated forward in the X direction. Each foot 45 has a linear bearing 47 which slides on a rail, so that the entire applier can slide fore and aft along its major axis (X axis). As shown in FIG. 8, at least one of the feet 45 is connected to a chain 27 via a chain connector 29. The chain 27 is driven by a gear 28 connected to a servo motor (not shown), which slides the entire applier 10 fore and aft along support rails 26.

The table is driven forward and lifted upward into position so that the forward nose 120 of the table is located adjacent the bottom outer surface 200 (6 o'clock position) of the tire building drum, as shown in FIG. 3*b*. The brush rollers are lifted upward by the actuation of the linear actuator and are positioned adjacent the nose of the table and the tire building drum (in the 5:00 o'clock position). After the table and rollers are in position, the ply or component is conveyed forward by rotation of the conveyor belts. The brush rollers lift up and support the ply and transfer the ply to the outer surface of the tire building drum by applying pressure to the ply against the drum as the drum rotates. After the ply or component is applied to the drum, the table is retracted, lowered and returned to the start position.

The ply or sheet misalignment may also be corrected by the use of the independent conveyors 60,62,64. As described above, each conveyor belt can move in the + or − direction independent of the other conveyors. If the sheet is rotated onto the conveyor table, then one or more of the belts can be driven forward or backwards to rotate the sheet in the desired direction and into the alignment position. At least one of the conveyor belts is stationary, to facilitate the rotation of the sheet on the conveyor table.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for applying a sheet of flexible material to a cylindrical body, the sheet having a first and second lateral edge and a front edge, the method comprising the steps of:
   a. receiving the sheet of flexible material onto a conveyor belt of a conveyor table, wherein the conveyor belt can translate in an X direction, wherein the conveyor belt has a plurality of rollers rotatably mounted on the conveyor belt, wherein a rotational axis of each roller is parallel with the X direction so the sheet can be moved in a Y direction transverse to the X direction by the plurality of rollers;
   b. aligning one of the lateral edges of the sheet with an edge guide of the conveyor table by tilting the conveyor table;
   c. tilting the conveyor table back to a level position;
   d. moving a front edge of the conveyor table adjacent the cylindrical body;
   e. and applying the sheet onto the cylindrical body;
   wherein said conveyor table further comprising a plurality of support legs, each support leg comprising: an outer leg portion telescopically slidable over an inner leg portion, a respective nut connected to each outer leg portion, and a respective spindle engaged within each nut, each spindle being rotatably mounted in a longitudinally-fixed manner to the inner leg portion of its support leg; and
   wherein rotation of each spindle within its nut causes actuation of its nut and consequently the telescopic sliding of its outer leg portion over its inner leg portion.

2. The method of claim 1 further including the step of supporting the sheet of material with one or more brush rollers.

3. The method of claim 1 further including the step of supporting the sheet of material with a first and second row of rotatably mounted brush rollers, wherein at least one of the brush rollers has a different brush stiffness than the other brush rollers.

4. The method of claim 1 further including the step of supporting the sheet of material with a row of rotably mounted brush rollers, wherein the brush rollers at the center of the row have a different brush stiffness than the brush rollers located at each end of the row.

5. The method of claim 1 further including the step of supporting the sheet of material with a row of rotably mounted brush rollers, wherein the brush rollers at the center of the row have a softer brush stiffness than the brush rollers located at each end of the row.

6. The method of claim 1 wherein step d further includes moving a front nose of the conveyor belt adjacent to the cylindrical body at a bottom edge of the body.

7. The method of claim 1 wherein step d further includes tilting the conveyor table about a minor axis of the conveyor table until a front nose of the conveyor belt is positioned adjacent to the cylindrical body at a bottom edge of the body.

8. The method of claim 1 wherein step b further includes tilting the conveyor table about a longitudinal axis of the table.

9. The method of claim 1 wherein the conveyor table is tilted by lowering two of the support legs by sliding each outer portion of the two support legs over its respective inner portion.

10. The method of claim 1 wherein the conveyor table further comprises a common support frame, and each support leg is slidably mounted to the common a support frame.

11. The method of claim 1 wherein the conveyor table further comprises a common support frame, and each support leg is rotatably mounted to the common support frame.

12. The method of claim 1 wherein the conveyor table further comprises a common support frame, and each support leg is slidably mounted and rotatably mounted to the common support frame.

13. The method of claim 10 wherein the common support frame comprises two parallel support rails, and each support leg is slidably mounted over one of the support rails.

14. The method of claim 10 wherein the common support frame comprises two parallel support rails, wherein the inner portion of each support leg has a first end rotatably mounted to a respective foot, and each foot is slidably mounted onto one of the support rails.

15. The method of claim 1 wherein the conveyor table comprises two or more conveyor belts, each belt being independently movable of the other belts.

* * * * *